(12) United States Patent
Yang

(10) Patent No.: US 10,576,785 B2
(45) Date of Patent: Mar. 3, 2020

(54) RUBBER COMPOSITION FOR AIRCRAFT TIRE TREADS

(71) Applicant: Compagnie Generale des Etablissements Michelin, Clermont-Ferrand (FR)

(72) Inventor: Xiaofeng Shaw Yang, Simpsonville, SC (US)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 63 days.

(21) Appl. No.: 15/799,067

(22) Filed: Oct. 31, 2017

(65) Prior Publication Data

US 2018/0056717 A1 Mar. 1, 2018

Related U.S. Application Data

(63) Continuation of application No. 13/517,917, filed as application No. PCT/US2009/069375 on Dec. 23, 2009, now abandoned.

(51) Int. Cl.

| | |
|---|---|
| *B60C 1/00* | (2006.01) |
| *C08K 5/41* | (2006.01) |
| *C08L 7/00* | (2006.01) |
| *C08L 9/00* | (2006.01) |
| *C08L 21/00* | (2006.01) |
| *C08L 57/02* | (2006.01) |

(52) U.S. Cl.
CPC .............. *B60C 1/0016* (2013.01); *C08K 5/41* (2013.01); *C08L 7/00* (2013.01); *C08L 9/00* (2013.01); *C08L 21/00* (2013.01); *C08L 57/02* (2013.01); *B60C 2200/02* (2013.01)

(58) Field of Classification Search
CPC ..... B60C 1/0016; B60C 2200/02; C08K 5/41; C08L 7/00; C08L 9/00; C08L 21/00; C08L 57/02
USPC ........................................................ 523/156
See application file for complete search history.

(56) References Cited

U.S. PATENT DOCUMENTS

| | | | |
|---|---|---|---|
| 4,167,544 A | 9/1979 | Ramos et al. | |
| 4,417,012 A | 11/1983 | Moniotte | |
| 5,362,793 A | 11/1994 | Garro et al. | |
| 6,357,499 B1 | 3/2002 | Kralevich, Jr. et al. | |
| 7,084,228 B2 | 8/2006 | Labauze | |
| 7,253,225 B2 | 8/2007 | Labauze et al. | |
| 7,371,791 B2 | 5/2008 | Hattori et al. | |
| 7,431,061 B2 | 10/2008 | Mathieu et al. | |
| 8,138,260 B2 | 3/2012 | Nakakita | |
| 2003/0015271 A1 | 1/2003 | Meza et al. | |
| 2005/0032945 A1 | 2/2005 | Moniotte | |
| 2007/0161735 A1 | 7/2007 | Bergman | |
| 2008/0156404 A1 | 7/2008 | Brunelet et al. | |

FOREIGN PATENT DOCUMENTS

| | | |
|---|---|---|
| EP | 0899297 | 10/2001 |
| EP | 1050547 | 10/2004 |
| JP | 2002362107 | 12/2002 |
| JP | 2005219606 | 8/2005 |
| JP | 2005-537369 | 12/2005 |
| JP | 2008144023 | 6/2008 |
| JP | 2008-169317 | 7/2008 |
| JP | 2009-102469 | 5/2009 |
| KR | 20040012061 | 2/2004 |
| WO | WO 2008149589 | 12/2008 |

OTHER PUBLICATIONS

International Search Report and Written Opinion for PCT/US2009/069375 dated Feb. 25, 2010.
EP Search Report for PCT/US2009069375, dated Jun. 25, 2013.

*Primary Examiner* — Angela C Scott
(74) *Attorney, Agent, or Firm* — Dority & Manning, P.A.

(57) ABSTRACT

Tire treads, especially tire treads for aircraft or for heavy vehicles, formed from a material that is based upon a cross-linkable rubber composition, the cross-linkable rubber composition comprising, per 100 parts by weight of rubber, between 40 phr and 100 phr of a polyisoprene rubber, between 0 and 60 phr of a highly unsaturated diene rubber and between 1 phr and 25 phr of a polyterpene resin having a glass transition temperature of between 50° C. and 120° C. The rubber composition further includes between 0.1 phr and 10 phr of a poly-thiosulfate anti-reversion agent having the formula:

$$MO_3S-S-X-S-SO_3M$$

wherein X is an alkylene radical or a radical comprising two or more alkylene units, pairs of which units being linked through an oxygen or a sulfur atom, through a group —$SO_2$—, —NH—, —$NH_2^+$—, —N($C_{1-16}$alkyl)- or —COO—, or through an arylene or cycloalkylene radical and M is a metal.

21 Claims, No Drawings

RUBBER COMPOSITION FOR AIRCRAFT TIRE TREADS

RELATED APPLICATIONS

The present application is a continuation application of U.S. patent application Ser. No. 13/517,917, filed on Jun. 20, 2012, which is the U.S. National Stage entry of International Application Number PCT/US2009/069375 filed under the Patent Cooperation Treaty having a filing date of Dec. 23, 2009, which are all herein incorporated by reference.

BACKGROUND OF THE INVENTION

Field of the Invention

This invention relates generally to rubber compositions and more particularly, to rubber compositions and aircraft tire treads comprising such rubber compositions.

Description of the Related Art

Aircraft tire treads are subjected to extreme operating conditions that require the tire treads to endure significant forces upon landing of an aircraft as the tire touches ground and instantly accelerates to relatively high speeds under load. Likewise, the treads experience significant forces upon aircraft takeoffs that require a rapid acceleration to relatively high speeds under load.

Aircraft tires are especially subject to chevron cutting caused by the grooves that are cross-cut into the runways at many airports. These grooves help drain water away from the runways and help prevent hydroplaning that may otherwise occur should water be left standing on the runways. Unfortunately, the edges of the grooves can cause cutting in the aircraft tires as they "spin-up" at touchdown. As the tire is loaded and accelerated during the landing, the resulting deformation of the tire in the runway grooves and the forces exerted on the tire can result in a tearing action that causes the chevron cuts in the tire.

What is needed are improved materials for making aircraft tire treads that are resistant to the chevron cutting typically caused by the grooves cut into the runways.

SUMMARY OF THE INVENTION

Particular embodiments of the present invention include compositions useful for the manufacture of tire treads, especially tire treads for aircraft, as well as the tires having treads made of such compositions. Some embodiments include an aircraft tire tread formed from a material that is based upon a cross-linkable rubber composition, the cross-linkable rubber composition comprising, per 100 parts by weight of rubber, between 40 phr and 100 phr of a polyisoprene rubber, between 0 and 60 phr of a highly unsaturated diene rubber and between 1 phr and 25 phr of a polyterpene resin having a glass transition temperature of between 50° C. and 120° C. In some embodiments, the polyterpene resin is a polylimonene resin.

The rubber composition further includes between 0.1 phr and 10 phr of a poly-thiosulfate anti-reversion agent having the formula:

$$MO_3S—S—X—S—SO_3M$$

wherein X is an alkylene radical or a radical comprising two or more alkylene units, pairs of which units being linked through an oxygen or a sulfur atom, through a group —$SO_2$—, —NH—, —$NH_2^+$—, —N($C_{1-16}$alkyl)- or —COO—, or through an arylene or cycloalkylene radical and M is a metal.

Without being delimitative of the invention, M may be an alkali metal, magnesium, calcium, barium, zinc, cobalt or nickel and X may be a radical of pentamethylene, hexamethylene, heptamethylene, octamethylene, nonamethylene, decamethylene, dodecamethylene or hexadecamethylene and M is sodium, magnesium, calcium, barium, zinc, cobalt, or nickel.

In particular embodiments, the tread manufactured from the materials as described above may be useful for a heavy vehicle tire.

In particular embodiments, the tread may be formed of the material described above comprising both the polyterpene resin and the poly-thiosulfate anti-reversion agent but further being limited to comprising only natural rubber as the rubber elastomer making up the rubber composition.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include aircraft tires having treads made with a rubber composition that is based upon a cross-linkable rubber composition having both a polyterpene resin and a poly-thiosulfate anti-reversion agent. It has been discovered that the combination of the polyterpene resin and the poly-thiosulfate anti-reversion agent in the rubber composition used to manufacture the aircraft tire treads provides a tread that is surprisingly resistant to both chevron cutting and wear. In some embodiments, the polyterpene resin is limited to a polylimonene resin.

While most of the following discussion applies to aircraft tires, it should be recognized that the rubber composition disclosed below could, in particular embodiments, be useful in forming treads of heavy vehicle tires. Heavy vehicles include, for example, truck tires, bus tires, subway train tires, tractors, trailers, agricultural, earthmover and other off-the-road (OTR) tires and generally do not include, for example, passenger car vehicles and light trucks.

Typically aircraft tires are made with a rubber composition that includes a plasticizing oil to reduce the viscosity of the green (uncured) rubber mix so that the rubber composition can be easily mixed and further processed, e.g., extruded into a tire tread. While it is known to use resins in place of plasticizing oil, the combination of a polyterpene resin and a poly-thiosulfate anti-reversion agent has provided a tire tread having significant improvement in resistance to chevron cutting.

In addition to the polyterpene resin and the poly-thiosulfate anti-reversion agent, the aircraft tread of particular embodiments of the present invention is formed from a material that is based upon a cross-linkable rubber composition that further includes a polyisoprene rubber and may further include a highly unsaturated diene rubber. The term "based upon" as used herein recognizes that the treads are made of vulcanized or cured rubber compositions that were, at the time of their assembly, uncured or green. The cured composition is therefore "based upon" the uncured rubber composition. In other words, the cross-linked rubber composition is based upon the cross-linkable rubber composition.

The polyterpene resins useful for embodiments of the present invention may be unmodified and may include, for example, polylimonene, polyalpha-pinene, polybeta-pinene, or mixtures thereof. "Polyterpene resins" as used herein are known to those having ordinary skill in the art to be terpene resins that are based upon alpha and/or beta pinene, limonene or combinations thereof and do not include in particular tail oil derivatives, rosin derivatives, terpene phenolic resins and hydroxylated polyesters. Unmodified polyterpene resins have not undergone further processing by having additional functionalities (chemical moieties) added to them.

Polylimonene is a homopolymer of limonene or 4-isopropenyl 1-methyl-cyclohexene. It exists in the form of three possible isomers: L-limonene (levorotatory enantiomer), D-limonene (dextrorotatory enantiomer) and dipentene, the racemate of the dextrorotatory and levorotatory enantiomers. Polylimonene resins ("resin" is a solid compound at ambient conditions) are known essentially for their application as adhesives in the food processing industry.

The polyterpene resin useful for particular embodiments of the present invention may include at least one of the following characteristics: a glass transition temperature (Tg) of between 50° C. and 120° C., a number-average molecular weight (Mn) of between 400 and 2000 g/mol, and/or polydispersity index (Ip) of less than 2, wherein the polydispersity index is the ratio of the weight average molecular weight (Mw) to the number-average molecular weight (Mn). Other embodiments of the present invention include a polyterpene resin that may be characterized as having at least two of these characteristics or alternatively, all three of these characteristics.

Alternatively, the polyterpene resin may include at least one of the following characteristics: a Tg of between 60° C. and 100° C., a molecular weight Mn of between 500 and 1000 g/mol and/or a polydispersity index of less than 1.8. Other embodiments of the present invention include a polyterpene resin that may be characterized as having at least two of these characteristics or alternatively, all three of these characteristics.

The glass transition temperature Tg is measured by DSC (Differential Scanning calorimetry) in accordance with ASTM D3418 (1999). The macrostructure (Mw and Mn) of the polyterpene is determined by steric exclusion chromatography (SEC) having a detector that includes a differential refractometer calibrated by mass of polystyrene. The SEC is operated at a temperature of 35° C. using tetrahydrofuran as the solvent at a flow rate of 1 ml/min and a concentration of 1 g/l.

Particular embodiments of the present invention include an amount of the polyterpene resin of between 1 phr and 25 phr. Alternatively, the amount of the polyterpene resin may be between 1 phr and 5 phr, between 1 phr and 4 phr, between 5 phr and 25 phr or between 5 phr and 20 phr.

Suitable polyterpene resins are available commercially, for example, as Dercolyte L120 (a polylimonene resin) from DRT, with offices in Dax Cedex, France. Dercolyte L120 may be characterized as having an Mn of 625 g/mol, an Mw of 1010 g/mol, an Ip of 1.6 and a Tg of 72° C. Other examples of suitable polylimonene resins include SYLVAGUM TR7125C and SYLVARES TRS 5147, both available from Arizona Chemicals having offices in Dover, Ohio. SYLVAGUM TR7125C may be characterized as having a Mn of 630 g/mol, an Mw of 950 g/mol, an Ip of 1.5 and a Tg of 70° C. Another example is PICCOLYTE R2495 (a polyalpha-pinene resin) from Hercules which may be characterized as having an Mn of 800 g/mol, an Mw of 1430 g/mol, an Ip of 1.8 and a Tg of 88° C.

Anti-reversion agents are well known in the rubber industry and are often added to dienic-based rubber compositions to prevent the deterioration of physical properties caused by reversion. The phenomenon of reversion occurs when the polysultidic cross-links that are formed during vulcanization deteriorate with time and temperature. This reduction of the cross-links that were fanned during vulcanization leads to the deterioration of some physical properties of the rubber composition, such as lower modulus and higher hysteresis.

There are many classes of anti-reversion agents that are known to one having ordinary skill in the art. For example, bis-maleimides constitute one commonly described family of anti-reversion agents; bis-citraconimides and bis-succinimides have been described as anti-reversion agents; likewise, dithiocarbamate salts are known as anti-reversion agents. Well known anti-reversion agents further include poly-thiosulfate compounds as described in U.S. Pat. No. 4,417,012, which is hereby fully incorporated by reference for all that it discloses, including specific examples of such compounds and their synthesis.

Indeed, as noted above, it has been found that an aircraft tire tread made of a material based upon a highly unsaturated diene rubber composition having both a polylimonene resin as described above and a poly-thiosulfate anti-reversion agent is surprisingly resistant to chevron cutting and wear. The poly-thiosulfate anti-reversion agent used in particular embodiments of the present invention is of the formula:

$$MO_3S-S-X-S-SO_3M \qquad (1)$$

wherein X is an alkylene radical or a radical comprising two or more alkylene units, pairs of which units being linked through an oxygen or a sulfur atom, through a group $-SO_2-$, $-NH-$, $-NH_2^+-$, $-N(C_{1-16}alkyl)-$ or $-COO-$, or through an arylene or cycloalkylene radical and M is a metal.

In particular embodiments, the metal may be one of the alkali metals: lithium, sodium, potassium, rubidium, cesium and francium. Alternatively, but not delimitative of the invention, the metal may be magnesium, calcium, barium, zinc, cobalt or nickel.

In particular embodiments, X may be a radical of pentamethylene, hexamethylene, heptamethylene, octamethylene, nonamethylene, decamethylene, dodecamethylene or hexadecamethylene and M may be sodium, magnesium, calcium, barium, zinc, cobalt, or nickel.

The poly-thiosulfate anti-reversion agents may include the water of crystallization. For example, a suitable poly-thiosulfate anti-reversion agent useful in particular embodiments of the present invention is hexaniethylene 1,6-bis (thiosulfate), disodium salt, dihydrate, available from Flexsys (with offices in Ohio) as DURALINK HTS.

The poly-thiosulfate anti-reversion agent is added to rubber compositions of particular embodiments of the present invention in an amount of between 0.5 phr and 10 phr or alternatively, between 0.1 phr and 7 phr, between 1 phr and 6 phr, between 1 phr and 3 phr, 1 phr and 5 phr or between 0.1 and 3 phr.

The rubber elastomers that are useful for particular embodiments of the present invention include natural rubbers, synthetic rubbers or combinations thereof. Particular embodiments of the present invention include rubber elastomers that are highly unsaturated diene elastomers. Diene elastomers or rubber is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %.

Within the category of essentially unsaturated diene elastomers, highly unsaturated diene elastomer is understood to mean in particular a diene elastomer having a content of units of diene origin (conjugated dienes) that is greater than 50 mol. %.

The rubber elastomers suitable for use with particular embodiments of the present invention include highly unsaturated diene elastomers, for example, polybutadienes (BR), polyisoprenes (IR), natural rubber (NR), butadiene copolymers, isoprene copolymers and mixtures of these elastomers.

Also suitable for use in particular embodiments of the present invention are rubber elastomers that are copolymers and include, for example, butadiene-styrene copolymers (SBR), butadiene isoprene copolymers (BIR), isoprene-styrene copolymers (SIR) and isoprene-butadiene-styrene copolymers (SBIR) and mixtures thereof.

Also suitable for use in particular embodiments of the present invention are rubber elastomers that that include, for example, natural rubber, synthetic cis-1,4 polyisoprenes and mixtures thereof. These synthetic cis-1,4 polyisoprenes may be characterized as possessing cis-1,4 bonds at more than 90 mol. % or alternatively, at more than 98 mol. %.

Diene elastomers such as butyl rubbers, nitrile rubbers or copolymers of dienes and of alpha-olefins of the ethylene-propylene diene terpolymer (EPDM) type or the ethylene-vinyl acetate copolymer type do not fall within the preceding definition of essentially unsaturated diene elastomers, and may in particular be described as "essentially saturated" diene elastomers (low or very low content of units of diene origin, i.e., less than 15 mol. %. Particular embodiments of the present invention include no essentially saturated diene elastomers.

Particular embodiments of the material useful for aircraft tires further include a reinforcing filler, such filler being inorganic, organic or combinations thereof. The inorganic reinforcing filler is to be understood here to mean any inorganic or mineral filler, whatever its color and its origin (natural or synthetic), also referred to as "white" filler or sometimes "clear" filler in contrast to carbon black. Such inorganic filler is capable, on its own, without any other means than an intermediate coupling agent, of reinforcing a rubber composition intended for the manufacturing of a tire tread, i.e., is capable of replacing a conventional tire-grade carbon black (for treads) in its reinforcement function. Such fillers may include, for example, a filler of the siliceous or aluminous type, or a mixture of these two types of fillers.

Carbon black, which is an organic filler, may be used as a sole filler or in combination with one or more inorganic fillers. The compounding amount of the carbon black in the elastomer composition is not limited. In particular embodiments of the present invention, the compounding amount of the carbon black may be up to about 200 phr or between about 10 and about 180 phr. Other useful ranges of carbon black loading may include between 30 and 100 phr in some embodiments of the present invention or between 35 and 70 phr.

Suitable carbon blacks are any carbon blacks, in particular the blacks that are conventionally used in tires and particularly in treads. Non-limitative examples of carbon blacks include, for example, the N115, N134, N234, N330, N339, N343, N347 and N375 carbon blacks. Some embodiments limit the useful carbon blacks to those having an average nitrogen surface area of between 70 and 150 m$^2$/g as measured by the ASTM D 6556 test method or alternatively between 100 and 150 m$^2$/g. The Iodine Adsorption Number of suitable carbon blacks may range, for some embodiments, between 80 and 160 g/kg according to the ASTM D 1510 test method or alternatively between 100 and 160 g/kg.

For those embodiments that employ silica as a reinforcing filler, the silica (SiO$_2$) used may be any reinforcing silica known to the person skilled in the art. Particular embodiments include any precipitated or pyrogenic silica having a BET surface area and a specific CTAB surface area both of Which are less than 450 m/g, or from 30 to 400 m$^2$/g. Highly dispersible precipitated silicas (referred to as "HD") arc included in particular embodiments, in particular for those embodiments used for the manufacturing of tires having a low rolling resistance. "Highly dispersible. silica" is understood in known manner to mean any silica having a substantial ability to disagglomerate and to disperse in an elastomeric matrix, which can be observed in known manner by electron or optical microscopy on thin sections. As non-limitative examples of such preferred highly dispersible silicas, mention may be made of the silicas BV3380 and Ultrasil 7000 from Degussa, the silicas Zeosil 1165 MP and 1115 MP from Rhodia, the silica 2000 from PPG, the silicas Zeopol 8715 or 8745 from Huber, and treated precipitated silicas such as, for example, the aluminium-"doped" silicas.

The physical state in which the reinforcing inorganic filler is present is immaterial, whether it is in the form of a powder, micro-beads, granules, balls or any other form.

The amount of reinforcing inorganic filler may be between 0 and 100 phr, or alternatively, for example, between 5 phr and 10 phr. The amount of reinforcing inorganic filler is not meant to be limited and may be at any quantity suitable for a particular purpose. The reinforcing inorganic filler may be mixed with a carbon black filler for some applications. In such applications, the amount of carbon black and the amount inorganic filler is adjusted accordingly, as known to one having ordinary skill in the art, to suit the particular purpose.

Particular embodiments of the rubber composition useful for aircraft tire treads as disclosed herein include little or no processing oil. Such oils are well known to one having ordinary skill in the art, are generally extracted from petroleum (although plant oils, e.g., sunflower oil, are also useful) and are classified as being paraffinic, aromatic or naphthenic type processing oil and include, for example, MES and TDAE oils. Some embodiments of the rubber composition may include an elastomer, such as a styrene-butadiene rubber, that has been extended with one or more such processing oils but such oil is limited in the rubber composition as being no more than 6 phr of the total elastomer content of the rubber composition or alternatively, no more than 4 phr, no more than 2 phr or no more than 1 phr. Likewise other rubber compositions in accordance with the present invention that do not include an extended elastomer may include no more than the same amount of processing oils as might be contained in an extended elastomer as noted above.

Other additives can be added to the rubber composition disclosed herein as known in the art. Such additives may include, for example, some or all of the following: coupling agents (if an inorganic reinforcing filler is used), antidegradants, antioxidants, fatty acids, waxes, stearic acid, zinc oxide and other accelerators. Examples of antidegradants and antioxidants include 6PPD, 77PD, IPPD and TMQ and may be added to rubber compositions in an amount, for example, of between 0.5 and 5 phr. Zinc oxide may he added in an amount, for example, of between 1 and 6 phr or between 2 and 4 phr. Waxes may be added in an amount, for example, of between 1 and 5 phr.

Accelerators are used to control the time and/or temperature required for vulcanization and to improve the properties of the cured rubber composition. As noted above, the primary accelerator in the rubber composition disclosed herein is a sulfonamide, which is added in an amount that is proportional to the amount of sulfur added. Combinations of accelerators are often useful to improve the properties of the cured rubber composition and the particular embodiments include the addition of secondary accelerators.

Particular embodiments may include the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

The invention is further illustrated by the following examples, which are to be regarded only as illustrations and not delimitative of the invention in any way. The properties of the compositions disclosed in the examples were evaluated as described below.

Moduli of elongation (MPa) were measured at 10% (MA10), 100% (MA 100) and at 300% (MA 300) at a temperature of 23° C. based on ASTM Standard D412 on dumb bell test pieces. The measurement were taken in the second elongation; i.e., after an accommodation cycle. These measurements are secant moduli in MPa, based on the original cross section of the test piece.

The Mooney viscosity ML(1+4) at 100° C. is measured in accordance with Standard ASTM D 1646 of 1999.

Hysteresis losses (HL) were measured in percent by rebound at 60° C. at the sixth impact in accordance with the following equation:

HL(%)=100($W_0$-$W_1$)/$W_1$, where $W_0$ is the energy supplied and $W_1$ is the energy restored.

Tear Resistance Index (TR): The tear resistance indices were measured at 100° C. The breaking load (FRD) is in N/mm of thickness and the elongation at break (ARD) in percentage are measured on a test piece of dimensions 10×142×2.5 mm notched with 3 notches that each have a depth of 3 mm. The tear resistance index is then provided by the following equation:

TR=(FRD*ARD)/100.

EXAMPLE 1

This example demonstrates the improved physical properties of rubber formulations useful for aircraft tire treads utilizing a polyterpene resin.

Two thermochemical stages were used to prepare the rubber compositions having the material components shown in Table 1 (amounts shown in phr). The formulations were prepared by mixing the components given in Table 1, except for the sulfur and the curing agents, to 165° C. in a lab-scale Banbury mixer. The mixtures were then dropped and cooled to about ambient temperature. The sulfur and curing agents were then added on a roll mill. Vulcanization was effected at 150° C. for about 25 minutes. The formulations were then tested to measure their physical properties.

TABLE 1

Effect of Polyterpene Resin on Rubber Formulations

| Formulations | W1 | F1 | F2 |
|---|---|---|---|
| Natural Rubber | 70 | 70 | 70 |
| Polybutadiene Rubber | 30 | 30 | 30 |
| Carbon Black (N234) | 55 | 55 | 55 |
| Plasticizer Oil (Naphthenic Oil) | 7.5 | 11 | 7.5 |
| Polyterpene Resin | 0 | 0 | 4 |
| Additives (Wax & 6PPD) | 3 | 3 | 3 |
| Stearic Acid and Zinc Oxide | 8 | 8 | 8 |
| Accelerator | 0.9 | 0.9 | 0.9 |
| Sulfur | 1.5 | 1.5 | 1.5 |
| Poly-thiosulfate Anti Reversion Agent | 0 | 0 | 0 |
| Physical Properties | | | |
| Uncured Mooney, ML(1 + 4) 100° C. | 84 | 79 | 77 |
| MA10 @ 23° C. (MPa) | 5.17 | 4.88 | 4.65 |
| MA100 @ 23° C. (MPa) | 2.26 | 2.12 | 1.94 |
| MA300 @ 23° C. (MPa) | 2.80 | 2.60 | 2.35 |
| Hysteresis Losses, % at 60° C. | 21.6 | 21.3 | 23.0 |
| Breaking Load @ 100° C., (N/mm) | 31 | 27 | 31 |
| Elongation at Break @ 100° C., (%) | 190 | 178 | 220 |
| Tear Resistance Index (TRI) | 58.9 | 48.1 | 68.2 |
| Normalized TRI | 100 | 82 | 157 |

The polybutadiene had a Tg of −105° C. and a cis 1,4-content of 93%. The carbon black was N234. The polyterpene resin was PICCOLYTE R2495 from Hercules. The plasticizer oil was naphthenic oil. The accelerator was TBBS. The additives included ingredients typically added to such formulations, e.g., wax, 6PPD and TMQ.

These lab data demonstrate that adding more plasticizer oil resulted in decreased tear resistance properties. However, replacing the plasticizer oil with the polyterpene resin provides a rubber composition having improved tear properties without a significant loss in the modulus.

EXAMPLE 2

This example demonstrates the change in physical properties of rubber formulations utilizing a poly-thiosulfate anti-reversion agent and utilizing both a polylimonene resin and a poly-thiosulfate anti-reversion agent. The formulations shown in Table 2 were prepared in the same manner as those prepared in Example 1 except that formulations W3 and F4 were prepared in factory-scale mixers. In addition, some of the samples were overcured by extending their cure time to about 120 minutes to determine the effect of overcuring on the rubber formulations.

TABLE 2

Effect of Polylimonene Resin and Poly-thiosulfate Anti-reversion Agent

| Formulations | W2 | F3 | W3 | F4 |
|---|---|---|---|---|
| Natural Rubber | 100 | 100 | 70 | 70 |
| Polybutadiene Rubber | 0 | 0 | 30 | 30 |
| Carbon Black (N234) | 50 | 50 | 54 | 55 |
| Plasticizer Oil (Naphthenic Oil) | 0 | 0 | 7 | 1 |
| Polylimonene Resin | 0 | 0 | 0 | 8 |
| Additives | 3.5 | 3.5 | 3 | 3 |
| Stearic Acid and Zinc Oxide | 5.5 | 6.5 | 8 | 8 |
| Accelerator | 0.8 | 0.8 | 0.81 | 0.81 |
| Sulfur | 1.5 | 1.5 | 1.35 | 1.35 |
| Poly-thiosulfate Anti Reversion Agent | 0 | 3 | 6 | 1.5 |

TABLE 2-continued

Effect of Polylimonene Resin and Poly-thiosulfate Anti-reversion Agent

| Formulations | W2 | F3 | W3 | F4 |
|---|---|---|---|---|
| Physical Properties @ Regular Cure | | | | |
| Uncured Mooney, ML (1 + 4) @ 100° C. | 80.3 | 80.8 | 64.0 | 64.4 |
| MA10 @ 23° C. (MPa) | 4.99 | 4.98 | 4.85 | 4.63 |
| MA100 @ 23° C. (MPa) | 2.11 | 2.09 | 1.97 | 1.86 |
| MA300 @ 23° C. (MPa) | 2.65 | 2.61 | 2.47 | 2.25 |
| Hysteresis Losses, % at 60° C. | 21.9 | 22.4 | 24.3 | 25.6 |
| Breaking Load @ 100° C., (N/mm) | 54 | 60 | 32 | 36 |
| Elongation at Break @ 100° C., (%) | 394 | 408 | 223 | 255 |
| Tear Resistance Index (TRI) | 213 | 244 | 72 | 92 |
| Physical Properties @ Overcure (Expressed as % of values of Regular Cure) | | | | |
| Uncured Mooney, ML(1 + 4) 100° C. | | | | |
| MA10 @ 23° C. (MPa) | −9% | −1% | −11% | −2% |
| MA100 @ 23° C. (MPa) | −13% | −1% | −18% | −7% |
| MA300 @ 23° C. (MPa) | −15% | −2% | −25% | −10% |
| Hysteresis Losses, % at 60° C. | 20% | 11% | 28% | 18% |
| Breaking Load @ 100° C. (N/mm) | −21% | −34% | 19% | 6% |
| Elongation at Break @ 100° C., (%) | −14% | −29% | 49% | 24% |
| Tear Resistance Index (TRI) | −32% | −53% | 76% | 31% |

The polybutadiene had a Tg of −105° C. and a cis 1,4-content of 93%. The carbon black was N234. The polylimonene resin was SYLVARES TR5147 from Arizona Chemical. The plasticizer oil was a naphthenic oil. The accelerator was CBS for W2 and F3 and was TBBS for W3 and F4. The additives included ingredients typically added to such formulations, e.g., wax, 6PPD and TMQ. The poly-thiosulfate anti-reversion agent was DURALINK HTS from Flexsys.

A comparison of the results for W2 and F3 shown in Table 2 demonstrate that adding the poly-thiosulfate anti-reversion agent had the anticipated result of improving the overcured modulus properties of the compositions but at a cost of a large decrease in the tear resistance index (−53%). However, a comparison of the results for W3 and F4 shown in Table 2 surprisingly demonstrate improved tear properties (+31%) with only a minimal decrease in the modulus properties when both the poly-thiosulfate anti-reversion agent and the polylimonene resin are added to the rubber composition.

EXAMPLE 3

This example demonstrates the improved resistance to chevron cutting and wear provided by aircraft tire treads manufactured with rubber compositions having both the polylimonene resin and the poly-thiosulfate anti-reversion agent.

The rubber formulations shown in Table 3 were mixed in a factory scale mixer in the same fashion and using similar materials as in Example 2 and then utilized to manufacture aircraft tire treads. The aircraft tires were H49X19.0 size tires. The tires were then mounted on aircraft and monitored for their performance. Tires mounted on nose landing gears and on main landing gears were tested for their wear resistance and for their ability to resist chevron cutting.

TABLE 3

Rubber Formulations for Tire Treads and Testing Results

| Formulations | W2 | F4 |
|---|---|---|
| Natural Rubber | 70 | 70 |
| Polybutadiene Rubber | 30 | 30 |
| Carbon Black N234 | 54 | 55 |
| Plasticizer Oil (MES Oil) | 6 | 0 |
| Polylimonene Resin L120 | 0 | 8 |
| Additives | 3 | 3 |
| Stearic Acid and Zinc Oxide | 8 | 8 |
| Accelerator | 0.81 | 0.81 |
| Sulfur | 1.35 | 1.35 |
| Poly-thiosulfate Anti Reversion Agent | 0 | 1.5 |
| Physical Properties | | |
| LPT Index for Nose Tires | 100 | 112 |
| LPT Index for Main Tires | 100 | 108 |
| Field Chevron Cutting Index | 100 | 145 |

The landing per tread (LPT) index is a subjective measurement of the number of landings a group of tires can undergo before the tire is considered "worn." The aircraft tires that were mounted on the nose landing gears and the main landing gears were monitored and inspected to determine how many landings each tire was able to withstand before the tires were worn. The greater the number of landings that the tires were able to complete, the higher the LPT Index. The index is reported normalized to the tires manufactured with the witness rubber.

The main landing gear tires were also inspected to determine the extent of chevron cutting. The field chevron cutting index was calculated as reversely proportional to the cut ranking and then normalized to the W2 witness. Therefore, the higher the index, the better the cut resistance. The chevron cut ranking is a subjective test based on the severity of the cuts, including cut width and depth, ranking from 1 to 4, where 4 is the most severe cutting. A comparison of the results shown in Table 3 demonstrate that aircraft tires manufactured with a rubber composition comprising both the polylimonene resin and the poly-thiosulfate anti-reversion agent were significantly more resistant to chevron cutting and possessed significantly improved wear properties.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended, The terms "preferably," "preferred," "prefer," "optionally," "may," and similar terms are used to indicate that an item, condition or step being referred to is an optional (not required) feature of the invention.

Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. An aircraft tire comprising:
a tread formed from a material that is based upon a cross-linkable rubber composition, the tread forming a ground touching surface of the aircraft tire, the cross-linkable rubber composition comprising, per 100 parts by weight of rubber;
between 60 phr and 90 phr of a polyisoprene rubber and between 10 phr and 40 phr of a polybutadiene rubber,
a combination of a polylimonene resin and a poly-thiosulfate anti-reversion agent in an amount sufficient to increase resistance of the tread to Chevron cutting when the aircraft tire is mounted on an aircraft and subjected to landings and takeoffs, the polylimonene resin having a glass transition temperature of between 50° C. and 100° C., and the poly-thiosulfate anti-reversion agent having the formula:

$$MO_3S—S—X—S—SO_3M$$

wherein X is the alkylene radical or a radical comprising two or more alkylene units, pairs of which units being linked through an oxygen or a sulfur atom, through a group $—SO_2—$, $—NH—$, $—NH_2^+—$, $—N(C_{1-16}alkyl)-$ or $—COO—$, or through an arylene or cycloalkylene radical and M is a metal, and wherein the cross-linkable rubber composition includes no processing oil.

2. An aircraft tire as defined in claim 1, wherein the polylimonene resin is present in the cross-linkable rubber composition in an amount between 5 phr and 25 phr and wherein the poly-thiosulfate anti-reversion agent is present in the cross-linkable rubber composition in an amount between 1 phr and 6 phr.

3. The aircraft tire of claim 1, wherein the polyisoprene rubber is a natural rubber.

4. The aircraft tire of claim 1, wherein the number-average molecular weight of the polylimonene resin is between 400 and 2000 g/mol.

5. The aircraft tire of claim 1, wherein M is an alkali metal, magnesium, calcium, barium, zinc, cobalt or nickel.

6. The aircraft tire of claim 1, wherein the poly-thiosulfate anti-reversion agent includes the water of crystallization.

7. The aircraft tire of claim 1, wherein X is a radical of pentamethylene, hexamethylene, heptamethylene, octamethylene, nonamethylene, decamethylene, dodecamethylene or hexadecamethylene and M is sodium, magnesium, calcium, barium, zinc, cobalt, or nickel.

8. The aircraft tire of claim 1, wherein the poly-thiosulfate anti-reversion agent is hexamethylene 1,6-bis(thiosulfate), disodium salt, dihydrate.

9. The aircraft tire of claim 1, wherein the poly-thiosulfate anti-reversion agent is in an amount of between 1.5 phr and 2 phr.

10. The aircraft tire of claim 1, wherein the poly-thiosulfate anti-reversion agent is in an amount of between 1 phr and 3 phr.

11. The aircraft tire of claim 1, wherein the number-average molecular weight of the polylimonene resin is between 400 and 1000 g/mol.

12. The aircraft tire of claim 1, wherein the cross-linkable rubber composition includes no SBR.

13. The aircraft tire of claim 1, wherein the cross-linkable rubber composition contains no reinforcing inorganic filler.

14. The aircraft tire of claim 1, wherein the polybutadiene rubber is present in the cross-linkable rubber composition in an amount between 10 and 30 phr.

15. An aircraft tire as defined in claim 1, wherein the aircraft tire has a size and shape suitable for mounting to an aircraft.

16. An aircraft tire as defined in claim 1, wherein the cross-linkable rubber composition further contains carbon black, the carbon black having an Iodine Adsorption Number of between 80 g/kg and 160 g/kg.

17. A method for making an aircraft tire tread comprising:
adding to a cross-linkable rubber composition a combination of a polylimonene resin and a poly-thiosulfate anti-reversion agent in an amount sufficient to increase resistance to Chevron cutting, the cross-linkable rubber composition comprising per 100 parts by weight of rubber between 60 phr and 90 phr of a polyisoprene rubber and between 10 phr and 40 phr of a polybutadiene rubber, the polylimonene resin having a glass transition temperature of between 50° C. and 100° C., the poly-thiosulfate anti-reversion agent having the following formula:

$$MO_3S—S—X—S—SO_3M$$

wherein X is the alkylene radical or a radical comprising two or more alkylene units, pairs of which units being linked through an oxygen or a sulfur atom, through a group $—SO_2—$, $—NH—$, $—NH_2^+—$, $—N(C_{1-16}alkyl)-$ or $—COO—$, or through an arylene or cycloalkylene radical and M is a metal, wherein the cross-linkable rubber composition includes no processing oil;
adding sulfur and at least one curing agent to the cross-linkable rubber composition; and
forming the cross-linkable rubber composition into an aircraft tire tread and vulcanizing the composition, the cross-linkable rubber composition forming a ground touching, surface of the aircraft tire tread.

18. A method as defined in claim 17, wherein the polylimonene resin is present in the cross-linkable rubber composition in an amount between 5 phr and 25 phr and wherein the poly-thiosulfate anti-reversion agent is present in the cross-linkable rubber composition in an amount between 1 phr and 6 phr.

19. A method as defined in claim 17, wherein the cross-linkable rubber composition includes no SBR.

20. A method as defined in claim 17, wherein the cross-linkable rubber composition contains no reinforcing inorganic filler.

21. A method as defined in claim 17, wherein the cross-linkable rubber composition further contains carbon black, the carbon black having an Iodine Adsorption Number of between 80 g/kg and 160 g/kg.

* * * * *